April 3, 1945.                A. J. SCHIER                2,373,055
GASOLINE MIXTURE INDICATOR
Filed Sept. 4, 1942
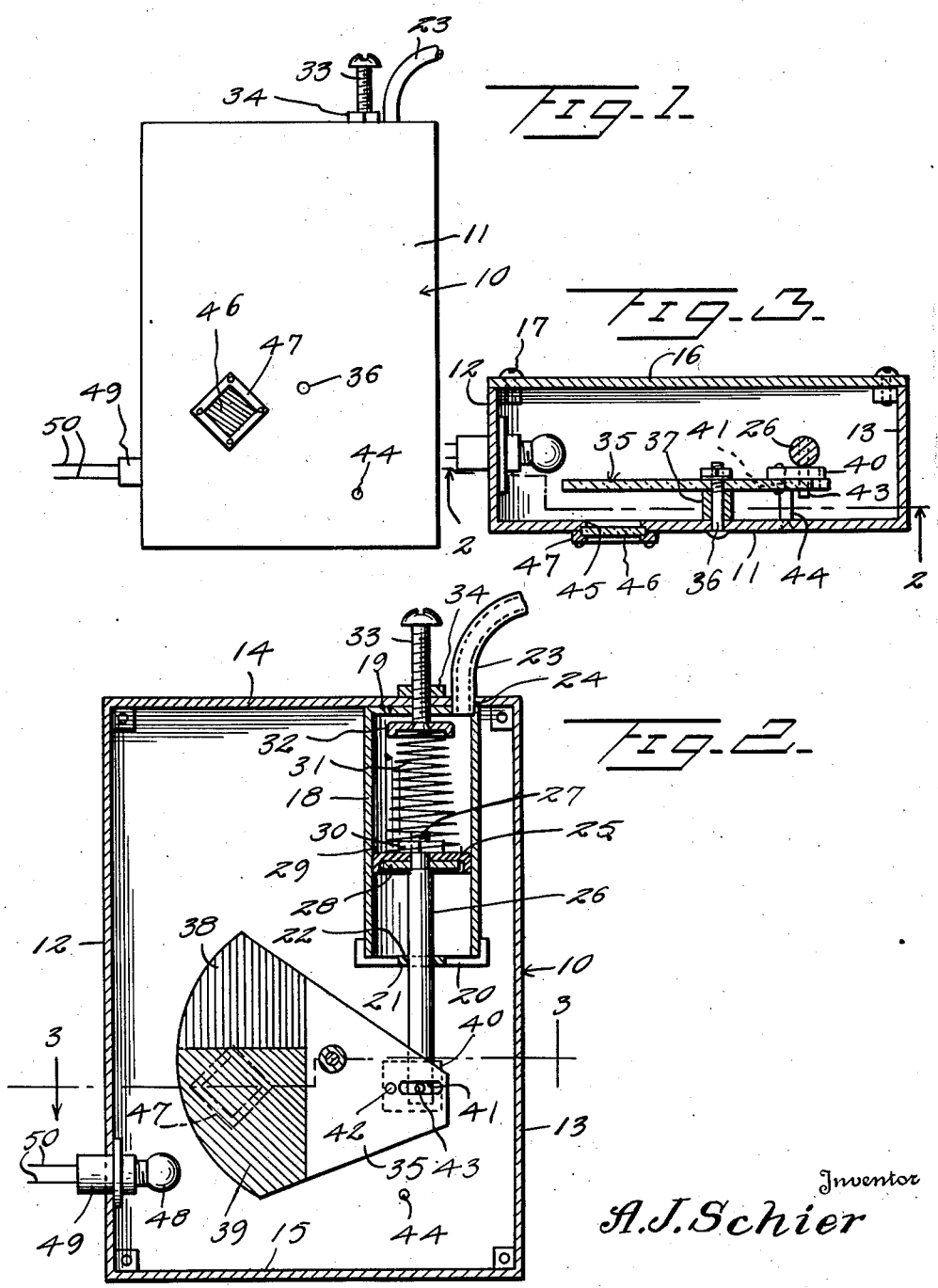
Inventor
A. J. Schier
By Kimmel & Crowell
Attorneys Patented Apr. 3, 1945

2,373,055

UNITED STATES PATENT OFFICE 2,373,055

GASOLINE MIXTURE INDICATOR

Adolph J. Schier, Atlanta, Ga., assignor to Automotive Products, Inc., Atlanta, Ga., a corporation of Georgia Application September 4, 1942, Serial No. 457,373

3 Claims. (Cl. 116—114)

This invention relates to internal combustion engines and more especially to a signal means for indicating economical engine operation.

An object of this invention is to provide a vacuum operated signal means which is adapted to be connected to the intake manifold of the engine whereby the driver will have a visible indication operated by variation of vacuum to show whether the throttle opening is substantially correct for the desired engine speed.

In the operation of an internal combustion engine, when the engine is operating at correct throttle opening for a given vehicle speed the vacuum is at a maximum for such speed, but when the accelerator is rapidly depressed the vacuum is reduced until the engine increases in speed and is normal or proportionate for the increased throttle opening. When the vehicle is moving up an incline the tendency is to depress the accelerator excessively, with the result that because of the increased load the engine speed cannot increase proportionately to the throttle opening, so that the normal vacuum for such speed is greatly reduced and an excessive quantity of fuel is drawn into the engine cylinders, and this excessive fuel is not properly vaporized or mixed with air drawn through the carburetor. Where a vacuum operated windshield wiper is in operation, the driver of the vehicle can regulate the throttle opening with the wiper as a guide, but under conditions obtaining which make unnecessary the operation of the vacuum wiper, the driver does not have any visible indication as to the proper throttle opening for the best or economical engine operation for the desired speed. It is, therefore, an object of this invention to provide a visible indication at all times which will give an indication as to the proper engine operation.

A further object of this invention is to provide a signal structure of this kind which will not affect the suction or vacuum in the intake manifold of the engine.

A further object of this invention is to provide a signal device of this kind which is simple in construction and includes a minimum of parts so that it will require very little force to operate the same and will not readily get out of order.

To the foregoing objects and to others which may hereinafter appear, the invention consists of the novel construction, combination, and arrangement of parts as will be more specifically referred to and illustrated in the accompanying drawing, wherein is shown an embodiment of this invention, but it is to be understood that changes, variations, and modifications may be resorted to which fall within the scope of the invention as claimed.

In the drawing:

Figure 1 is a detail front elevation of a vacuum operated signal constructed according to an embodiment of this invention;

Figure 2 is a vertical section taken through the device taken on line 2—2 of Figure 3; and Figure 3 is a sectional view taken on the line 3—3 of Figure 2.

Referring to the drawing the numeral 10 designates generally a housing which includes a front wall 11, side walls 12 and 13, upper and lower walls 14 and 15, and a rear wall 16. In the present instance, the rear wall 16 is removable, being secured to the housing 10 by fastening devices 17. The housing 10 is adapted to be arranged at a convenient point within a motor vehicle and may be mounted on either the steering column, the dash board, or other convenient point.

The housing 10 has secured to the top wall 14 thereof, a depending cylinder 18 which has an upper end wall 19 secured in any suitable manner to the lower side of the top wall 14. The lower end of the cylinder 14 is preferably open and diametrically disposed guide bar 20 is secured across the open end of the cylinder 18, and is provided centrally thereof with a guide boss 21 having a guide opening 22. A tube 23 is connected at one end to the end wall 19 of the cylinder 18, being extended through an opening 24 provided in the top wall 14. The other end of the tube 23 is adapted to be connected to a suitable source of vacuum supply and may be interposed in the suction line connected to a windshield wiper or may be connected to the intake manifold of an internal combustion engine.

A piston, generally designated as 25, is slidable within the cylinder 18 and includes a piston rod 26 which is slidable through the guide opening 22 and which is formed at its upper end with a reduced stud 27. A plate 28 is mounted on the stud 27 and a flexible sealing washer 29 is mounted on the upper side of the plate 28 and secured upon the stud 27 by means of a nut 30. The piston 25 is constantly urged downwardly by means of a spring 31 which, at its lower end, bears against the upper side of the piston 25. The upper end of the spring 31 bears against a pressure plate 32 which is carried by a spring adjusting screw 33. The screw 33 is threaded through the top wall 19 of the cylinder 18 and may be locked in adjusted position by means of a lock nut 34.

A signal member, in the form of a semaphore or the like, is disposed within the housing 10 below the cylinder 18. The signal comprises a plate 35 which is pivotally mounted on a pivot 36. The pivot member 36 extends through the front wall 11 and preferably a spacing sleeve 37 is disposed about the pivot member 36 so as to space the signal member 35 from the inner face of the front wall 11. The plate or signal member 35 is provided on the front face thereof with two color indications 38 and 39. The indication 38 may be green whereas the indication 39 may be red. The plate 35 has secured thereto a second plate or bearing member 40 which is provided with an elongated slot 41. The plate 40 may be secured to the rear side of the plate 35 by means of a fastening member 42. The lower end of the piston rod 26 has secured thereto a transversely disposed pin 43 which slidably engages in the slot 41 so that endwise movement of the piston rod 26 will effect rocking of the signal plate or member 35. The stop pin 44 is fixed to the front wall 11 on the inner side thereof, and disposed in the path of the downward swinging of the signal member 35 so as to thereby limit the swinging of this plate.

In order to provide a means whereby the signal member 35 may be visible to the driver of the vehicle, the front wall 11 of the housing is formed with a window opening 45 and a transparent panel 46 is secured by means of a frame 47 in the opening 45. A light bulb 48 is disposed within the housing 10 and is mounted in a light socket 49 carried by the side wall 12. This light socket 49 may be connected by means of a pair of conductors 50 to an electric circuit in the vehicle and, if desired, the conductors 50 may be interposed in either an independent electric circuit having a switch regulating the opening and closing of the circuit, or may be interposed in the lighting circuit so that when the vehicle lights are in operation the bulb 48 will also be lighted. If desired, the plate or signal member 35 may be of transparent material, which is formed with the two colors 38 and 39.

In the use and operation of this signal structure, the tube 23 is connected to a suction source, such as the windshield wiper duct or the intake manifold of the engine. When the vehicle is operating at normal engine operation for a given speed and the accelerator is depressed to a proper degree for the desired engine speed, the vacuum formed by the engine operation will be at a maximum for such speed and the suction from the pipe or tube 23 will drawn the piston 25 upwardly against the tension of the spring 31. Upward movement of the piston 25 will rock the green indication 38 downwardly to position this indication in registry with the window opening 45. The driver of the vehicle, upon seeing the green signal, will know that the throttle is properly depressed for the desired engine operation, and the engine is operated at its most economical fuel consumption. However, if the throttle should be depressed unduly, such as if the vehicle is moving up an incline, the vacuum in the cylinder 18 will be reduced so that the spring 31 will thereby be able to move the piston 25 downwardly and rock the plate 35 upwardly until the red indication 39 is in registry with the window 45. This red indication will be a notice to the driver of the vehicle that the engine is not operating at economical fuel consumption so that the accelerator pedal may then be raised to the desired point for the most economical operation whereupon the vacuum will be increased or brought back to substantially normal.

When the vacuum in the tube 23 is normal, or at a maximum, the piston 25 will be pulled upwardly, and the plate 35, at its free end, rocked downwardly so as to dispose the green indication 38 in registry with the window opening 45.

This device can be constructed at very small cost and, due to the simplicity of the device, it will not readily get out of order, and will be automatic in its operation and provide a means whereby the driver of the vehicle will be able to, at all times, determine when the engine is operating at its most economical operating speed.

I claim:

1. An operation indicating signal for internal combustion engines comprising a housing, a cylinder in said housing, means connecting one end of said cylinder to the suction side of said engine, a piston slidable in said cylinder and movable in one direction by suction from said engine, a piston rod fixed to said piston, a signal member pivotally carried by said housing and having an elongated slot, a pin carried by said piston rod slidably engaging in said slot whereby movement of said piston will rock said signal member, said housing having a window for exposing a portion of said signal member, and tensionable means for biasing said piston in the opposite direction.

2. An operation indicating signal for internal combustion engines comprising a housing formed with a front wall, opposite side walls, top and bottom walls, and a rear wall, a cylinder depending from said top wall and having an open lower end, a piston slidable in said cylinder, a piston rod fixed to said piston and extending downwardly therefrom, a guide for said rod carried by said cylinder, a signal plate in said housing provided with upper and lower areas on its front face colored green and red respectively, means pivotally supporting said plate intermediate its length from said front wall, a bearing plate fixed to said signal plate, said plates having aligned elongated slots therethrough, a pin fixed to the lower end of said piston rod and slidably engaged in said slots, a suction pipe extending through said top wall and having its inner end communicating with said cylinder, said pipe constituting means for connecting said cylinder with a suction source for drawing said piston upwardly, a spring in said cylinder between said top wall and said piston for urging the piston downwardly, a spring compression means threaded through said top wall, a transparent panel carried by said front wall in front of the signal plate, and a light bulb in said housing for lighting the signal plate.

3. In combination with an internal combustion engine, a housing including a front wall, side walls, upper and lower walls and a rear wall, a depending cylinder secured to the top wall of said housing, said cylinder having an upper wall secured to the under face of the top wall, the lower end of said cylinder being open, a diametrically disposed guide bar secured across the open end of said cylinder and provided with a boss having a guide opening, a tube connected at one end of the upper end wall of the cylinder and being extended through an opening provided in the top wall of the housing, a piston slidable within said cylinder and including a piston rod slidable through said guide opening and being formed at its upper end with a reduced stud, a plate mounted on the stud and a flexible sealing washer on the upper side of the plate and secured upon the stud by a nut, means for constantly urging said piston downwardly to bear against the closure plate, and a signal member in said housing connected with and operated by said piston rod.

ADOLPH J. SCHIER.